United States Patent
Azevedo et al.

(10) Patent No.: US 10,958,531 B2
(45) Date of Patent: Mar. 23, 2021

(54) ON-DEMAND REMOTE PREDICTIVE MONITORING FOR INDUSTRIAL EQUIPMENT ANALYSIS AND COST FORECAST

(71) Applicant: International Business Machines Corporation, Armonk, NY (US)

(72) Inventors: Leonardo Guerreiro Azevedo, Rio de Janeiro (BR); Alecio Binotto, Sao Paulo (BR); Fabio L. Gandour, Sao Paulo (BR); Ricardo Luis Ohta, Sao Paulo (BR); Marcelo Nery dos Santos, Rio de Janeiro (BR); Ademir Fereira Silva, Sao Paulo (BR); Vinicius Costa Villas Boas Segura, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 14/971,123

(22) Filed: Dec. 16, 2015

(65) Prior Publication Data
US 2017/0180214 A1     Jun. 22, 2017

(51) Int. Cl.
*H04L 12/24*    (2006.01)
*H04L 12/26*    (2006.01)
*H04W 4/38*     (2018.01)
*G06N 20/00*    (2019.01)

(52) U.S. Cl.
CPC ........... *H04L 41/147* (2013.01); *G06N 20/00* (2019.01); *H04L 43/045* (2013.01); *H04L 43/067* (2013.01); *H04W 4/38* (2018.02)

(58) Field of Classification Search
CPC .............................. H04W 4/38; H04L 41/147
USPC ......................................................... 709/224
See application file for complete search history.

(56) References Cited

U.S. PATENT DOCUMENTS

| | | | |
|---|---|---|---|
| 7,987,108 B2 | 7/2011 | Wetzer et al. | |
| 8,000,930 B2 | 8/2011 | Poncet et al. | |
| 8,081,996 B2 | 12/2011 | Kolavennu et al. | |
| 8,447,554 B2 | 5/2013 | Emami et al. | |

(Continued)

FOREIGN PATENT DOCUMENTS

| | | |
|---|---|---|
| EP | 2293164 A1 | 3/2011 |
| WO | 2010120440 A2 | 10/2010 |

(Continued)

*Primary Examiner* — Hua Fan
*Assistant Examiner* — Hien V Doan
(74) *Attorney, Agent, or Firm* — Harrington & Smith

(57) ABSTRACT

Sensor data is detected from at least one sensor selected and installed for detecting operating conditions of at least one equipment. The sensor data includes an operating condition of at least one equipment. The sensor is selected dependent on indications of a user restriction and a predictive model. A sensor data signal is generated dependent on the sensor data. The sensor data signal is transmitted to a network device for collecting the sensor data and transforming the collected sensor data into a formatted transmission signal having a format for transmission over a network to a network server. The network server receives the formatted transmission signal for performing on-demand service of at least one of analysis, reporting and visualization dependent on the operating condition.

24 Claims, 5 Drawing Sheets

(56) References Cited

U.S. PATENT DOCUMENTS

| | | | |
|---|---|---|---|
| 2009/0210075 A1* | 8/2009 | Moriwaki | H04L 41/0654 700/28 |
| 2013/0211559 A1 | 8/2013 | Lawson et al. | |
| 2013/0212214 A1 | 8/2013 | Lawson et al. | |
| 2014/0047064 A1 | 2/2014 | Maturana et al. | |
| 2014/0047107 A1 | 2/2014 | Maturana et al. | |
| 2015/0046106 A1* | 2/2015 | Wade | H04Q 3/00 702/63 |
| 2015/0182842 A1* | 7/2015 | Martikka | A63B 71/06 340/870.07 |
| 2016/0098305 A1* | 4/2016 | Bucsa | H04L 67/20 719/318 |

FOREIGN PATENT DOCUMENTS

| | | |
|---|---|---|
| WO | 2010120442 A2 | 10/2010 |
| WO | 2011106914 A1 | 9/2011 |
| WO | 2013075297 A1 | 5/2013 |

* cited by examiner

ON-DEMAND REMOTE PREDICTIVE MONITORING FOR INDUSTRIAL EQUIPMENT ANALYSIS AND COST FORECAST

BACKGROUND

The present invention relates to sensor networks and on demand predictive remote monitoring, and, particularly, to equipment analysis and cost forecast.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

Equipment defects, such as failures of electrical motors, have a severe impact in the industrial environment due to the importance and the large deployment of equipment in several different industrial sectors, such as metallurgical, and pulp and cellulose. To minimize the occurrence of equipment defects, a Preventive Maintenance schedule is often put in place, where several components are verified and/or replaced based on a maintenance plan provided, for example, by the manufacturer. The Preventive Maintenance plan of a manufacturer is often based on product development tests designed to ensure product reliability in most common use cases. However, the manufacturer's maintenance plan typically cannot address the specificity of each application or allow a more or less stringent maintenance plan, for example, tailored to a client's particular use and environment.

Recently, a more optimized approach has been adopted in industry, which is called Predictive Maintenance. Under the Predictive Maintenance approach, the equipment is frequently monitored for key variables (e.g., power consumption, vibration patterns, temperature, and humidity). By analyzing this data, it is possible to predict which kind of defect the machine most probably will have, and when this problem will eventually cause a failure. The Predictive Maintenance approach can thus be more efficient in terms of cost and defect detection, because unlike Preventive Maintenance, Predictive Maintenance optimizes the maintenance schedule to tend to minimize unnecessary interruptions in the equipment utilization. On the other hand, Predictive Maintenance relies on an efficient collection and analysis of relevant data to determine when maintenance is required and to determine which parts should be repaired or replaced. Conventionally, such data is collected manually, for example, by a technician with suitable analysis equipment.

After the data has been collected, an expert may analyze the collected information, and obtain predictive insights using the available data and mathematical models. This approach takes time and relies on expert experience and subjective factors. The predictive models vary accordingly with the type of variables being monitored (e.g., temperature, humidity, vibration, electrical power), the type of equipment/device being inspected (e.g., bearing rings, electrical motors), and also on the application scenario (e.g., refrigerators, heating devices, conveying belts, lifters, etc.). Due to this complex scenario, defining the most suitable predictive model to be used and the minimum amount of data to be collected to execute a good failure prediction is a challenging task.

The predictive maintenance approach, although more efficient in terms of cost and defect detection, must rely on a sensor data collection to obtain the necessary information to enable the early defect detection. Sensor deployment can be expensive, time consuming and often demands that the industrial production be halted (at least partially) in order to install the sensors and infrastructure such as cabling for data and power. Therefore, it is required to take into account the financial cost behind sensor deployment. For instance, installing hard wired sensors to obtain data and sending an expert to the field to execute equipment analysis is time consuming and expensive. Furthermore, this approach does not allow a continuous analysis over an extended period of time, and/or cannot be easily repeated in other similar scenarios.

Currently, there is a lack of financial methodology on how and/or when to install sensors and the best balance between cost deployment and expected benefits. Given the recent development of solutions and applications in the field of predictive remote monitoring, so far there are no methods to evaluate key aspects of a financial case to support an adequate decision making process in an on demand way.

To provide a business model based on defect prediction service for equipment, it is required to define sensor types and quantity of sensors, remotely activate and control the sensors, and analyze the produced data under a Sensor as a Service business model. The "as a service" solution provision has been thoroughly spread in many productive areas, like software as a service (SaaS). However, the predictive remote monitoring field is still not covered by this kind of solution in some areas, like sensoring. The selection, installation and use of individual sensors besides the corresponding supporting network provided as an on demand "as a service" approach is still an open issue. We foresee this as a viable alternative.

Additionally, there is a need for a mechanism to collect and aggregate diagnostic data pertaining to the use and health of equipment, and provide that collected data for remote analysis, forecasting and reporting.

SUMMARY

This section is intended to include examples and is not intended to be limiting. In accordance with an inventive method, sensor data is detected from at least one sensor selected and installed for detecting operating conditions of at least one equipment. The sensor generates sensor data signal which is transmitted to a network device. This device transforms the sensor data into a format for transmission over a network to a network server. The network server receives the signal and performs analysis, reporting and visualization, dependent on the operating conditions.

In accordance with an inventive apparatus, the apparatus comprises of one or more processors, one or more memories (including computer program code), and at least one sensor selected and installed for detecting operating conditions of at least one equipment. A sensor data signal is generated dependent on the sensor data.

In accordance with an inventive computer program product, a computer readable storage medium is provided having computer-readable code embodied thereon. The computer-readable code is executable by an apparatus and causes the apparatus, in response to execution of the computer-readable code, to detect sensor data from at least one sensor selected and installed for detecting operating conditions of at least one equipment. The sensor data includes an operating condition of at least one equipment. The sensor is selected dependent on indications of a user restriction and a predictive model.

DETAILED DESCRIPTION

Figure 1:
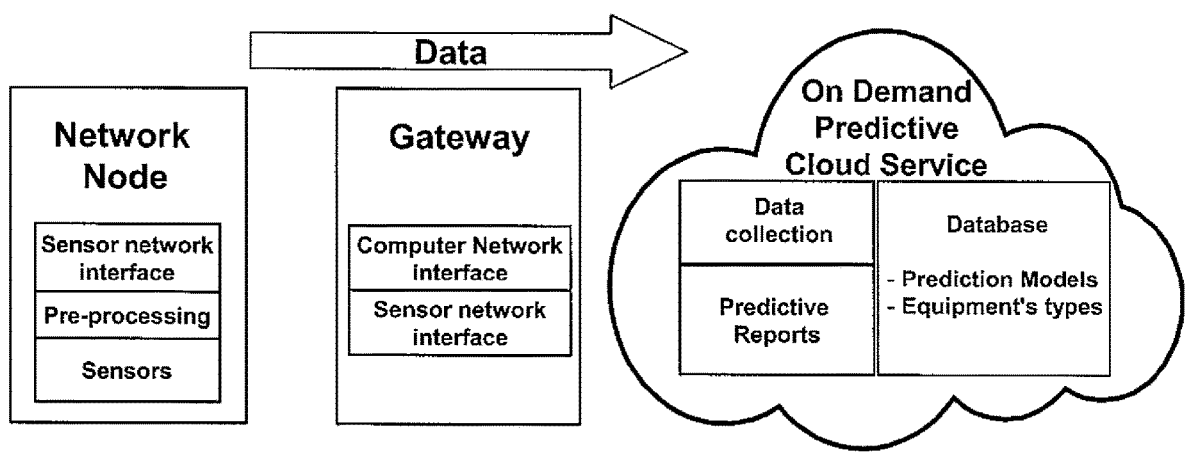
FIG. 1 illustrates a non-limiting exemplary embodiment showing a Network Node, a Gateway and an On Demand Predictive Cloud Service.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are non-limiting exemplary embodiments provided to enable persons skilled in the art to make or use the invention and not to limit the scope of the invention which is defined by the claims.

As stated above, in accordance with a non-limiting exemplary embodiment, sensor data is detected from at least one sensor selected and installed for detecting operating conditions of at least one equipment. The sensor data includes an operating condition of at least one equipment. The sensor is selected dependent on indications of a user restriction and a predictive model. A sensor data signal is generated dependent on the sensor data. The sensor data signal is transmitted to a network device for collecting the sensor data and transforming the collected sensor data into a formatted transmission signal having a format for transmission over a network to a network server. The network server receives the formatted transmission signal for performing on-demand service of at least one of analysis, reporting and visualization dependent on the operating condition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, dependent upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An non-limiting exemplary embodiment of the invention relies on a data collection and interpretation platform for predictive maintenance, based on the deployment of a wireless sensor network (WSN) and/or combination of eventual already installed sensors. This sensor network captures, collects and transmits data from the target equipment. The non-limiting exemplary embodiment uses a cloud computing infrastructure that receives the collected data and automatically chooses the most suitable predictive model, based on the analysis scenario and pre-establish criteria, such as monitoring time and predictive costs.

The non-limiting exemplary embodiment provides a method for quick deployment of remote monitoring services for industrial equipment. Sensor data is captured and intelligent analysis executed to obtain equipment health status under a certain period of time or financial restriction. In addition, the exemplary embodiment provides cost forecasts for the service to achieve such constraints.

Figure 7:
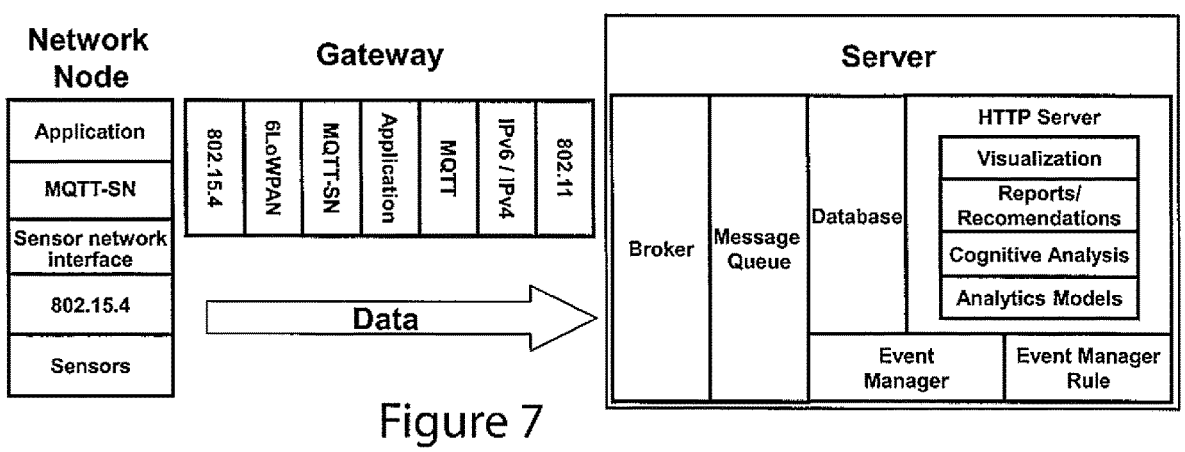
FIG. 7 is a block diagram showing the components of the Network Node, Gateway and Network Server in accordance with the embodiment shown in FIG. 1.

FIG. 1 illustrates a non-limiting exemplary embodiment showing a Network Node, a Gateway and an On Demand Predictive Cloud Service. A non-limiting exemplary embodiment enables a quick deployment of a sensor network that allows a service provider or maintenance team to obtain equipment health status during a predetermined period of time (e.g. one week or another suitable period that enables the collection of enough data to execute a diagnosis). FIG. 7 illustrates another non-limiting exemplary embodiment showing a Network Node, Gateway and Cloud-based Network Server. The Network Node includes the sensors fixed or in other sensing contact (direct or indirect) with the equipment(s) being monitored. A sensor network interface provides an interface between the sensor network and the Gateway. Sensor data is detected from at least one sensor selected and installed for detecting operating conditions of at least one piece of equipment. The sensor data includes an operating condition of at least one piece of equipment. The sensor is selected dependent on indications of a user restriction and a predictive model. Pre-processing of the sensor data may be performed by the sensor network before a sensor data signal containing the sensor data is sent to the Gateway. The Gateway is a network device that bridges the transmission of data from the sensor(s) of the Network Node and the computer of the Network Server. The Gateway includes a computer network interface and a sensor network interface. The Gateway receives the sensor data signal and collects the sensor data obtained from the sensor data signal. The collected sensor data is transformed into a formatted transmission signal dependent on the collected sensor data. The formatted transmission signal has a format that can be effectively transmitted to the Network Server. The Network Server (shown, for example, in FIG. 7), also called herein the On Demand Predictive Cloud Service (shown, for example, in FIG. 1) performs on-demand visualization, reports/recommendations, cognitive analysis, analytics modeling etc. The Network Server includes a computer network interface and receives the formatted transmission signal. The Network Server determines the operating condition from the received formatted transmission signal and performs at least one of analysis, reporting and visualization according to the operating condition.

The sensor network consist of (1) one or more Network Nodes including several sensors that are attached to the monitored equipment, (2) a Gateway, for collecting the data from the Network Nodes and transforming the collected data to a suitable transmission signal, for example, formatted for transmission over an internet-based network, and (3) a Cloud-based Network Server that executes Data Analysis and makes the analysis available, for example, for a Maintenance Team in a suitable format. Each module may include, but is not limited to the following components:

1) Network Node: Set of sensors (vibration, temperature, humidity, etc.), including signal pre-processing features and a Wireless Sensor Network interface 2) Gateway: Transform the Wireless Sensor Network data to a suitable format to be forwarded to the conventional IP network 3) Server: Receives the data from the Gateway and executes Analytics, Reports and Visualization. A non-limiting example of Analytics includes processing the sensor data and constructing models pertaining to the normal operation of a particular equipment, and calculating the probability of a new data sample to be considered to be a sample from the normal operation of the machine or a sample indicating a potential failure in the near future. A non-limiting example of Report includes the generation of documents stating the likelihood of a given equipment to fail in given timeframes. A non-limiting example of Visualization includes providing a visual interface where an expert may inspect sensor data remotely and make diagnoses for a particular equipment.

The non-limiting exemplary embodiment enables the quick deployment of a sensor network that allows a service provider or maintenance team to obtain equipment health status during a certain period of time (e.g., one week or another period that provides enough data to execute the diagnosis).

Figure 2A:
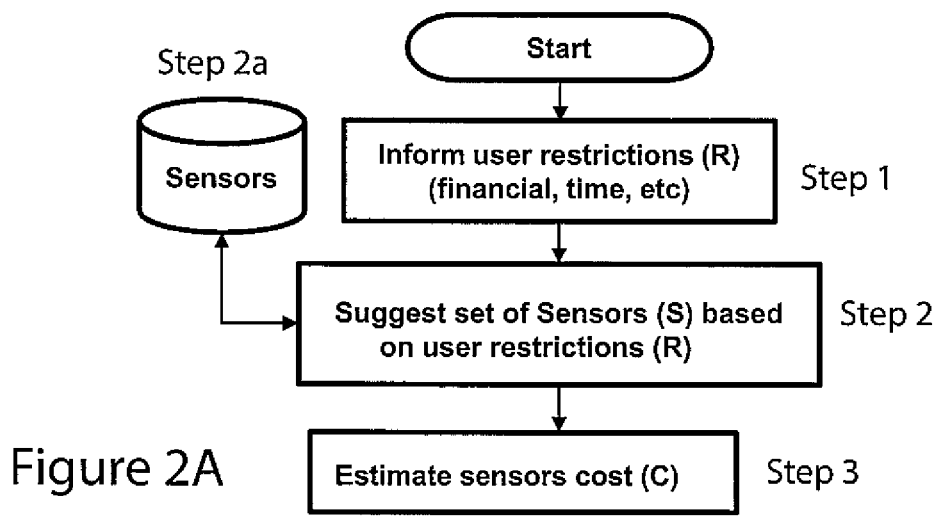
FIG. 2A is a flowchart illustrating the selection of sensors given a set of restrictions.

FIG. 2A is a flowchart illustrating the selection of sensors given a set of restrictions. In Step 1, the user informs the system about the Sensor Networks setup restrictions (R), such as information about the equipment to be monitored (type, model etc.), cost restrictions, desired sampling frequency etc. In Step 2, the system uses a sensors database (Step 2a) to suggest a set of sensors (S) based on the user restrictions (R). In Step 3, given a set of sensors (S), the system estimates the sensors cost (C), including, for example, installation and maintenance estimated costs.

Figure 2B:
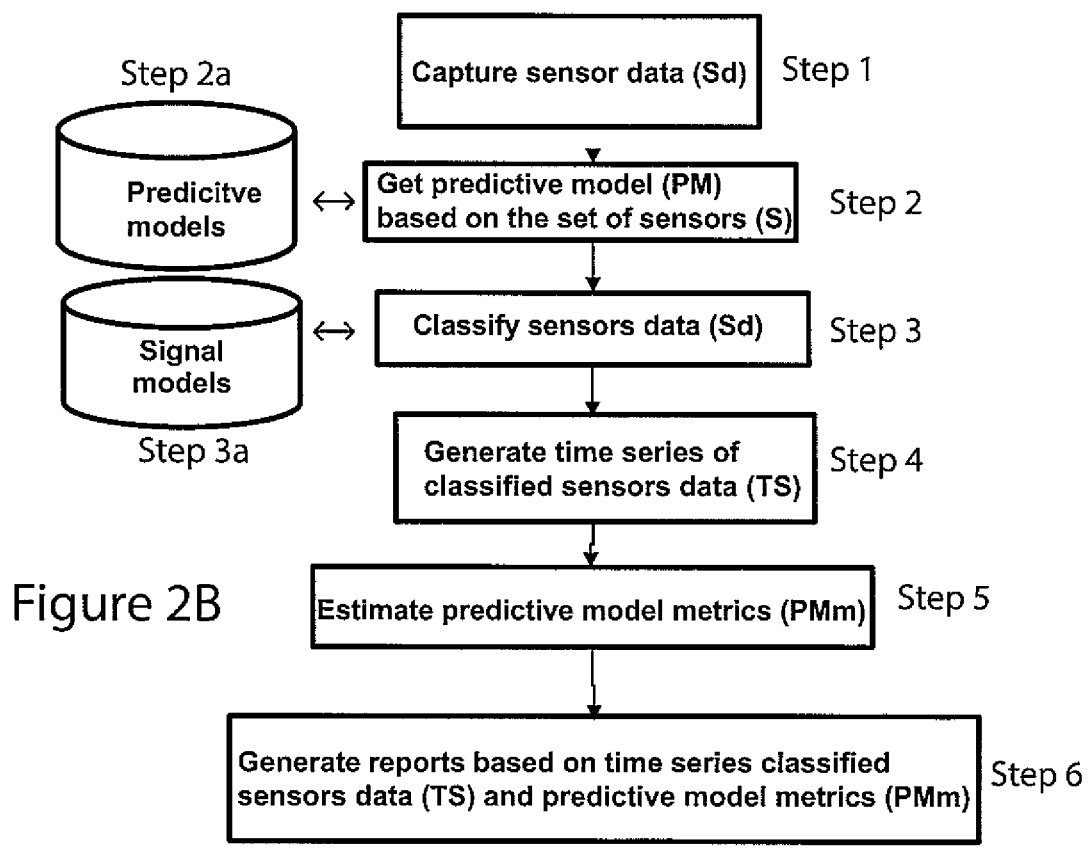
FIG. 2B is a flowchart illustrating an exemplary flow from capturing data to generating reports.

FIG. 2B is a flowchart illustrating an exemplary flow from capturing data to generating reports. In Step 1, data is captured from sensors (Sd). In Step 2, a predictive model (PM) is obtained from a predictive models database (Step 2a), based on the set of sensors (S). In Step 3, the sensors data (Sd) is classified according to a database of signal models (Step 3a), generating a time series of classified sensors data (TS) in Step 4. In Step 5, the time series of classified sensors data (TS) is combined with the predictive model (PM) to estimate the predictive model metrics (PMm), such as the failure risk of the monitored equipment, the cost of preventive maintenance, the cost impact of an equipment failure etc. In Step 6, a report is generated summarizing the time series of classified sensors data (TS) and the predictive model metrics (PMm).

Figure 3:
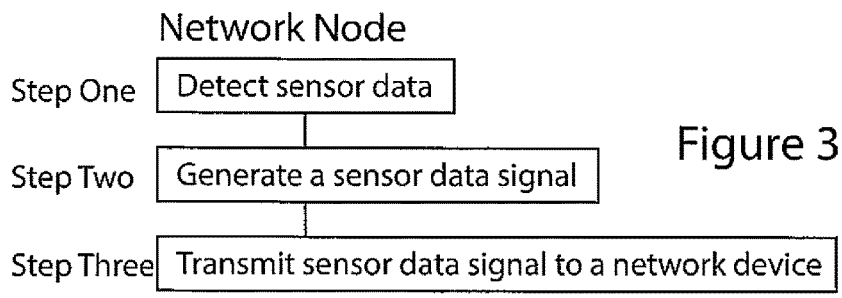
FIG. 3 is a flowchart illustrating the collection and transformation of a sensor signal by a Network Node, and the transmission of the signal to a Gateway.

FIG. 3 is a flowchart illustrating the detection of sensor data by a Network Node. Sensor data is detected from at least one sensor selected and installed for detecting operating conditions of at least one equipment (Step One). The sensor data includes an operating condition of at least one equipment. The sensor is selected dependent on indications of a user restriction and a predictive model. A sensor data signal is generated dependent on the sensor data (Step Two). The sensor data signal is transmitted to a network device (Step Three). The network device collects the sensor data and transforms the collected sensor data into a formatted transmission signal having a format for transmission over a network to a gateway.

Figure 4:
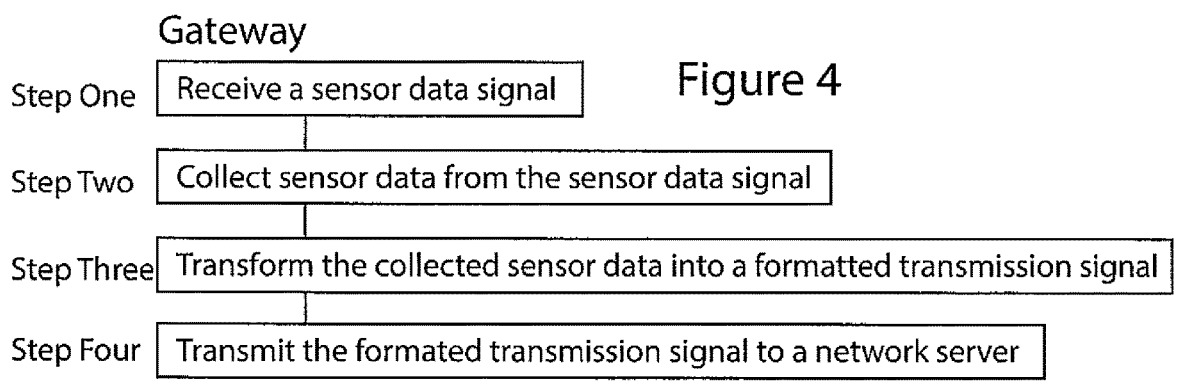
FIG. 4 is a flowchart illustrating the collection and transformation of a sensor signal by a Gateway, and the transmission of the signal to a network server.

FIG. 4 is a flowchart illustrating the collection and transformation of a sensor signal by a Gateway. A sensor data signal is received (Step One) from a Network Node. The sensor data obtained from sensor data signal is collected (Step Two). The collected sensor data is transformed into a formatted transmission signal dependent on the collected sensor data and having a format for transmission to a network server (Step Three). The formatted transmission signal is transmitted to the network server (Step Four), wherein the network server receives the formatted transmission signal for performing on-demand service of at least one of analysis, reporting and visualization dependent on the operating condition.

Figure 5:
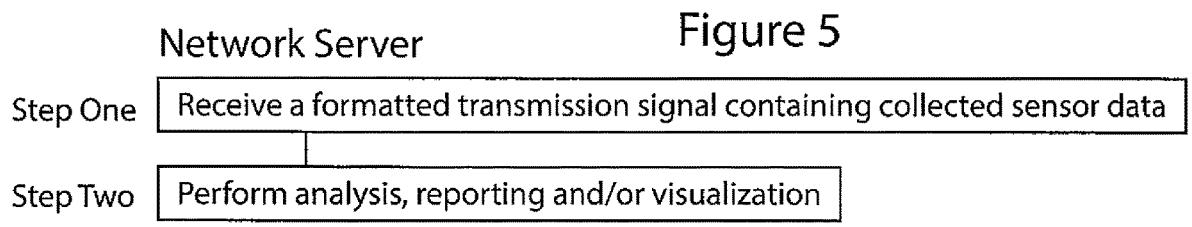
FIG. 5 is a flowchart illustrating the reception of collected sensor data and performing analysis, reporting and/or visualization by a Network Server.

FIG. 5 is a flowchart illustrating receiving collected sensor data and performing analysis, reporting and/or visualization by a Network Server. A formatted transmission signal is received (Step One). At least one of analysis, reporting and visualization is performed dependent on the operating condition (Step Two).

Figure 6:
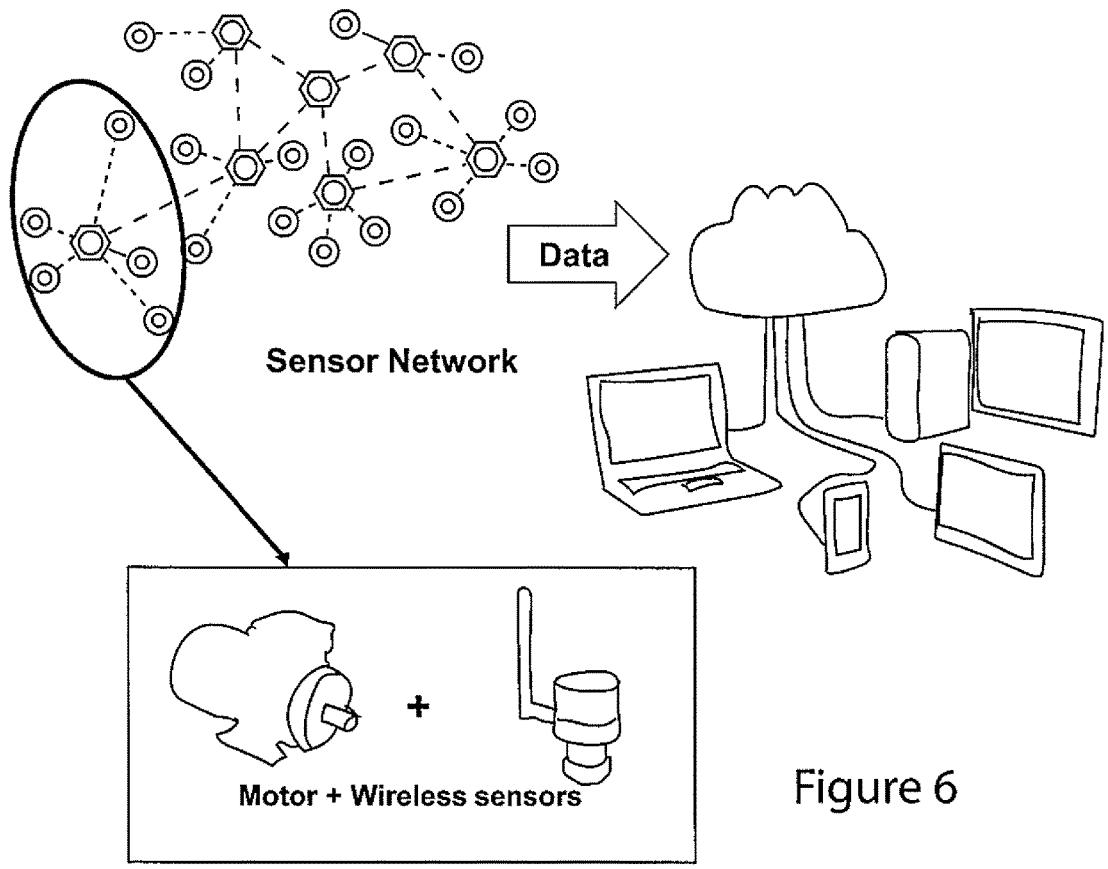
FIG. 6 shows an non-limiting exemplary embodiment comprising wireless sensors attached to at least one equipment.

FIG. 6 shows an non-limiting exemplary embodiment comprising wireless sensors attached to at least one equipment. In accordance with a non-limiting exemplary embodiment, wireless sensors/monitoring devices are installed on at least one equipment. For example, the deployment of this Network Node infrastructure may be done by using externally attached battery powered sensors (based on MEMS/Capacitive/Inductive detection) fixed onto or over equipment housing. Energy harvesting, for example, from vibrations of the machinery or ambient lighting can be used to supplement or as an alternative power source for the sensors. The sensors can detect, for example, vibration, temperature, age, air particulate and chemistry, equipment power consumption, sound, impact, moisture, etc. The sensors can be in direct contact with the equipment being monitored, such as magnetically or adhesively fixed to a housing of the machine, mounted to a stud fixed to the machine, etc. The sensors may be non-contact sensors, for example, thermal imaging devices. The Network Node sensors may perform, for example, the sensor data collection, data pre-processing and the transmission of the sensor data using a wireless network to the Gateway.

When setting up the sensor network, a mesh network sensor configuration may be deployed to increase reliability. The sensor network may be a multi-agent network for pre-processing sensor data and dynamic load balance between similar equipments (for example, to decrease production load on equipments with detected anomalies).

The Network Node may include a plurality of sensors forming a sensor network, where the sensor network is configured to pre-process the sensor data to identify a defective operating condition. For example, one or more sensors of the sensor network can be configured to pre-process the sensor data received from one or more sensors of the other sensors of the sensor network. For example, the plurality of sensors can be battery powered. A battery status of each sensor of the plurality of sensors can be determined and sensors having a relatively higher battery charge pre-process the sensor data received from sensors having a relatively lower battery charge. The sensor data can be transmitted to the network device via a publish-subscribe based messaging protocol. The sensors can be in direct or in indirect contact with the equipment being monitored. As examples of an indirect contact sensor, at least one sensor may comprise a thermal imaging camera, capacitive and magnetic sensors.

A cloud-based Network Server is set up and may be used to enable quick deployment and scalability. Sensor data is monitored and the data may be pre-processed before being uploaded to the Network Server. In accordance with the non-limiting exemplary embodiment, real-time or near real-time data collection is possible. Data analysis may be done remote from the physical location of the machines being monitored. The sensor data is transmitted, for example, from the Gateway to the Network Server over an Internet connection. The Network Server has capacities to analyze, report and provide visualization of the monitored operating conditions. This provides fast results, for quicker maintenance intervention, instead of waiting the typical several weeks for log analysis provided by traditional maintenance tools. If a problem is detected the Network Server can provide diagnostics and suggested maintenance intervention using analytics/machine learning/cognitive techniques to provide richer and detailed content results as compared to traditional human-based analysis. If a problem is not detected, then Network Server analysis results may indicate that no maintenance is required due to the sensed data.

The non-limiting exemplary embodiment can utilize Cognitive Analytics to derive knowledge of normal manufacturing plant behavior from received sensor data (e.g., machine learning) and input models (e.g., physics equations, cost models, production models). An abnormal behavior of a monitored system can be detected (based on knowledge of normal behavior of the system) to assist in the monitoring and prediction of possible machine failures. Future failures can be predicted and addressed, for example, during the machine's scheduled downtime, to reduce the costly possibility of an equipment being unavailable when needed.

The exemplary embodiment can be used to explain and advise human operators to help make the best decisions, for example, to maximize the equipment asset uptime (e.g., advising to increase production or which maintenance plan is better to put in place). The non-limiting exemplary embodiment can be used to integrate the workforce and workforce usage (for example, to allocate a maintenance staff to first correct urgent issues).

FIG. 6 shows an non-limiting exemplary embodiment comprising wireless sensors attached to at least one equipment. In accordance with this non-limiting exemplary embodiment, sensors may be attached to the equipment being monitored using non-invasive methods, such as magnetic, adhesive and/or stud mounting (for example, if a stud thread is already available). The configuration and set up of the wireless sensor network of the Network Node may utilize, for example, wireless communications including 6LoWPAN, Zigbee, WirelessHART, etc.

FIG. 7 is a block diagram showing the constituents of the Network Node, Gateway and Network Server in accordance with the embodiment shown in FIG. 1. The Network Node comprises of a system that connects to physical sensors in order to gather data from them. The sensors may be accessed through a wireless network protocol standard, such as IEEE 802.15.4, and once the data is collected it can be translated to another protocol, such as MQTT-SN. An application code executing on the Network Node manages the necessary steps to make the data available to the Gateway. The Gateway is usually a more capable system or computer that is responsible to perform data and protocol transformations, so the data is in a format suitable to be sent to the Network Server, using an appropriate communication protocol. The Gateway may use multiple different protocols to gather data coming from the Network Node and use another set of protocols to send the data do the Network Server, as appropriate. On the Server element, multiple components are represented and their responsibilities are as follows: (i) Broker: receives and organizes data streams coming from the gateway, and dispatches them to the message queue; (ii) Message queue: performs data cleansing, transformation, and queueing; besides, it routes queued messages to be processed by the other architecture modules; (iii) Database: stores received data; (iv) HTTP (Front-end) server: supports data analytics visualization, reporting, and recommendations for preventive actions; (v) Event Manager and Event Manager Rule: supports rules authoring, and performs real-time data analysis to deal with urgent event handling, firing alerts if conditions are met.

Figure 8:
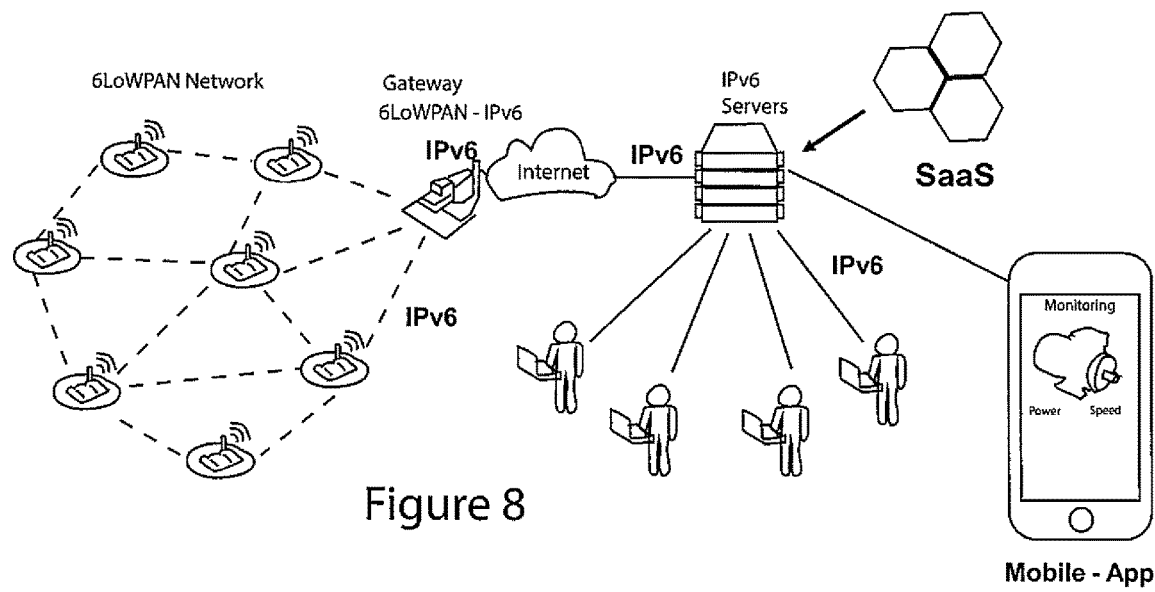
FIG. 8 shows an architecture example of the embodiment shown in FIG. 6.

FIG. 8 shows an architecture example of the embodiment shown in FIG. 7. A cloud-based Network Server may be set up as a SaaS (Software-as-a-Service), which will include, for example, a Broker, Message Queue, Database, Http Server (containing Analytics Models, Reports and Visualization of the insights), Event Manager, and Event Rule Manager. The equipment health status data is processed in real time by Analytics/Cognitive layers. The equipment health report can be provided and used to make maintenance suggestions, for example, to perform the maintenance before the equipment stops or has a significantly lower performance.

In accordance with the non-limiting exemplary embodiment shown, for example, in FIG. 8, a Network Node includes a wireless physical layer, such as 802.15.4, with MQTT as messaging protocol, all using 6LoWPAN as a Wireless Network Protocol. A Gateway converts the 6LoWPAN into a suitable conventional IP version (IPv4 or IPv6) transmission signal, using, for example, as a physical layer Ethernet (802.11.3) or Wi-Fi (e.g., 802.11a, b, g, n, ac). A cloud-based Network Server allows dynamic resource allocation, consisting essentially in MQTT, Database to store acquired data, Analytics/Cognitive Analysis, Report/Recommendation and Visualization for maintenance, which could be a Dashboard, SMS message, Email, App Push notifications etc.

Figure 9:
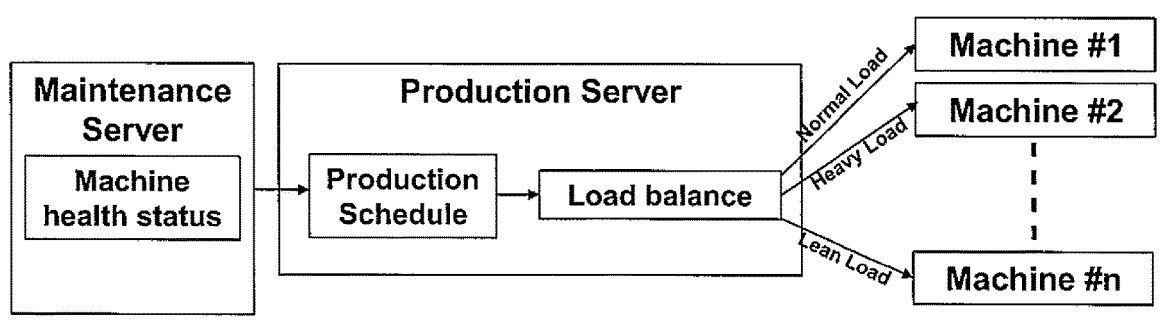
FIG. 9 is a block diagram showing the components of a Maintenance Server and Production Server in accordance with another non-limiting exemplary embodiment.

Another non-limiting exemplary embodiment is similar to the embodiment shown in FIG. 8. FIG. 9 is a block diagram showing the constituents of the Network Node including a Maintenance Server and Production Server in accordance with another non-limiting exemplary embodiment.

If the Network Server also has access to the Production Schedule, the Network Server may also provide suggestions of the best maintenance schedule (e.g., a maintenance window that minimizes the impact of the maintenance downtime in the production line) and, eventually, auto execute a load balance, so that a more suitable maintenance schedule can be put in place. For instance, usually on a holiday season, we would avoid as much as possible to stop a production line. Using this dynamic load balance, based on the equipment health status, it is possible to avoid it until the holiday season passes, so that it is more convenient.

Another non-limiting exemplary embodiment is similar to the embodiment shown in FIG. 9. FIG. 9 is a block diagram showing the constituents of the Network Node including a Maintenance Server and Production Server in accordance with another non-limiting exemplary embodiment.

The sensor data may be integrated with the Production Schedule, and a preventive dynamic load balancing can be deployed, which could postpone the maintenance for a more favorable maintenance window (e.g., after holiday season). The dynamic load balancing may decrease the production load over equipment with a detected problem and may allow the maintenance to be done after an initial forecast. In this case, the sensor network would still execute the health monitoring of the machines, to generate warnings, in case the wearing level becomes too high and the failure chances becomes considerably high. The integration of the sensor data is done in the Maintenance Server, so that, using a suitable predictive model, estimates of the machine health status can be done. Using the machine health status, it is possible to order the Production Server to increase the load on the machines that have a better health status, compensating for a lower load on the machines with worse health status.

Another non-limiting exemplary embodiment is similar to the embodiment shown in FIG. 6. In this case, the sensor network creates an "edge computing" network, in which the data can be pre-processed dependent on a parameter, such as battery availability, internet connection status, available bandwidth etc. For example, the availability of battery power on each node can be determined, so that nodes with lower batteries would have less pre-processing executed. The pre-processing load of a node with a weak battery could be sent to a nearby node, using the mesh network flexibility. This mechanism could be especially useful in cases where the internet connection is intermittent, so that some basic analytics algorithms could be executed to allow the defects detection to be executed. This utilization may require an increase in each node's storage capabilities and especially on the gateway. Data compression techniques could also be applied to decrease the data being stored and also decrease the bandwidth necessary to send the data to the cloud. Whenever the internet connection is available, the Gateway may be programmed to send data to the cloud-based Network Server, so that Big Data and more complex analytics algorithms could be executed aiming at more precise failure prediction.

In accordance with another embodiment, similar to the last embodiment, data is exchanged with a production forecast, so that the most energy efficient schedule can be implemented. This is done using a power consumption profile obtained by the data monitoring system over several manufacturing cycles and other variables, such as hourly or seasonal energy cost, so that a higher energy consumption is more likely to be required for a production schedule based on knowing when the cost of energy is lower.

What is claimed is:

1. A method, comprising:
   selecting at least one sensor from a database dependent on indications of one or more user restrictions comprising: at least a type of the at least one sensor, a cost of the at least one sensor, and a sampling frequency of the at least one sensor;
   wherein the at least one selected sensor is installed using a non-invasive method for detecting one or more operating conditions of at least one equipment;
   detecting sensor data from the at least one selected sensor, the sensor data including the one or more operating conditions of the at least one equipment,
   generating using a network node a sensor data signal dependent on the sensor data, the network node comprising:
      a sensor network interface;
      a maintenance server configured to manage a health status of the at least one equipment;
      a production server comprising a production schedule of the at least one equipment, the production server configured to balance a load of the at least one equipment based on the health status of the at least one equipment; and
      a data monitoring system configured to manage a power consumption profile of the at least one equipment, and to detect the sensor data via the sensor network interface,
   transmitting a formatted sensor data signal from the network node to a network device for collecting the sensor data, the formatted sensor data signal having been generated after execution of application code of the network node, and
   transforming, using the network device, the formatted sensor data signal into a formatted transmission signal having a format for transmission over a network to a network server,
   wherein the network server receives the formatted transmission signal for performing on-demand service of analysis of the formatted transmission signal, and a generation of at least one report based on the analysis of the formatted transmission signal related to the one or more operating conditions of the at least one equipment;
   wherein the at least one report is generated by combining classified sensor data with a predictive model to estimate predictive model metrics related to the at least one equipment, the predictive model metrics comprising at least one of: a failure risk, a cost of preventive maintenance, or a cost impact of an equipment failure;
   wherein the network server, with a web server, provides at least one recommendation for maintenance intervention of the at least one equipment based on the analysis of the formatted transmission signal.

2. The method of claim 1, wherein the network is the Internet.

3. The method of claim 1, wherein the network server is a cloud-based server.

4. The method of claim 1, wherein the sensor data signal is transmitted to the network device using 6LoWPAN as a wireless network protocol and the network device transforms the collected sensor data into one of an IPv4 or IPv6 formatted transmission signal.

5. The method of claim 1, wherein at least one sensor is one of a plurality of sensors forming a sensor network, and wherein the sensor network is configured to pre-process the sensor data forward to a gateway which forwards the sensor data to the network server which identifies a defective operating condition.

6. The method of claim 5, wherein one or more sensors of the sensor network is configured to pre-process the sensor data received from one or more sensors of the other sensors of the sensor network.

7. The method of claim 5, wherein the plurality of sensors are battery powered and further comprising determining a battery status of each sensor of the plurality of sensors wherein sensors having a relatively higher battery charge pre-process the pre-processing load sent from sensors having a relatively lower battery charge.

8. The method of claim 1, wherein the sensor data is transmitted to the network device via a publish-subscribe based messaging protocol.

9. An apparatus comprising:
   one or more processors; and one or more non-transitory memories including computer program code, one or more memories and the computer program code configured, with the one or more processors, to cause the apparatus to perform at least the following:
   select at least one sensor from a database dependent on indications of one' or more user restrictions comprising: at least a type of the at least one sensor, a cost of the at least one sensor, and a sampling frequency of the at least one sensor;
   wherein the at least one selected sensor is installed using a non-invasive method for detecting one or more operating conditions of at least one equipment;

detect sensor data from the at least one selected sensor, the sensor data including the one or more operating conditions of the at least one equipment, generate using a network node a sensor data signal dependent on the sensor data, the network node comprising:
  a sensor network interface;
  a maintenance server configured to manage a health status of the at least one equipment;
  a production server comprising a production schedule of the at least one equipment, the production server configured to balance a load of the at least one equipment based on the health status of the at least one equipment; and
  a data monitoring system configured to manage a power consumption profile of the at least one equipment, and to detect the sensor data via the sensor network interface, and transmit a formatted sensor data signal from the network node to a network device for collecting the sensor data, the formatted sensor data signal having been generated after execution of application code of the network node, and transforming, using the network device, the formatted sensor data signal into a formatted transmission signal having a format for transmission over a network to a network server, wherein the network server receives the formatted transmission signal for performing on-demand service of analysis of the formatted transmission signal, and a generation of at least one report based on the analysis of the formatted transmission signal related to the one or more operating conditions of the at least one equipment;

wherein the at least one report is generated by combining classified sensor data with a predictive model to estimate predictive model metrics related to the at least one equipment, the predictive model metrics comprising at least one of: a failure risk, a cost of preventive maintenance, or a cost impact of an equipment failure;

wherein the network server, with a web server, provides at least one recommendation for maintenance intervention of the at least one equipment based on the analysis of the formatted transmission signal.

10. A computer program product comprising a computer readable storage medium having computer-readable code embodied thereon, the computer-readable code executable by an apparatus and causing the apparatus, in response to execution of the computer-readable code, to perform at least the following:

select at least one sensor from a database dependent on indications of one or more user restrictions comprising: at least a type of the at least one sensor, a cost of the at least one sensor, and a sampling frequency of the at least one sensor;

wherein the at least one selected sensor is installed using a non-invasive method for detecting one or more operating conditions of at least one equipment;

detect sensor data from at least one selected sensor, the sensor data including one or more operating conditions of the at least one equipment, generate using a network node a sensor data signal dependent on the sensor data, the network node comprising:
  a sensor network interface;
  a maintenance server configured to manage a health status of the at least one equipment;
  a production server comprising a production schedule of the at least one equipment, the production server configured to balance a load of the at least one equipment based on the health status of the at least one equipment; and
  a data monitoring system configured to manage a power consumption profile of the at least one equipment, and to detect the sensor data via the sensor network interface, and transmit a formatted sensor data signal from the network node to a network device for collecting the sensor data, the formatted sensor data signal having been generated after execution of application code of the network node, and transforming, using the network device, the formatted sensor data signal into a formatted transmission signal having a format for transmission over a network to a network server, wherein the network server receives the formatted transmission signal for performing on-demand service of analysis of the formatted transmission signal, and a generation of at least one report based on the analysis of the formatted transmission signal related to the one or more operating conditions of the at least one equipment;

wherein the at least one report is generated by combining classified sensor data with a predictive model to estimate predictive model metrics related to the at least one equipment, the predictive model metrics comprising at least one of: a failure risk, a cost of preventive maintenance, or a cost impact of an equipment failure;

wherein the network server, with a web server, provides at least one recommendation for maintenance intervention of the at least one equipment based on the analysis of the formatted transmission signal.

11. A method, comprising:

receiving a sensor data signal from a network node generated dependent on sensor data detected by at least one selected sensor, the sensor data including one or more operating conditions of at least one equipment, the network node comprising:
  a sensor network interface;
  a maintenance server configured to manage a health status of the at least one equipment;
  a production server comprising a production schedule of the at least one equipment, the production server configured to balance a load of the at least one equipment based on the health status of the at least one equipment; and
  a data monitoring system configured to manage a power consumption profile of the at least one equipment, and to detect the sensor data via the sensor network interface, wherein the at least one selected sensor is installed using a non-invasive method for detecting one or more operating conditions of at least one equipment, wherein the at least one sensor is selected from a database dependent on indications of one or more user restrictions comprising: at least a type of the at least one sensor, a cost of the at least one sensor, and a sampling frequency of the at least one sensor;

collecting the sensor data obtained from a formatted sensor data signal from the network node, the formatted sensor data signal having been generated after execution of application code of the network node;

transforming the formatted sensor data signal into a formatted transmission signal dependent on the collected sensor data and having a format for transmission over a network to a network server, and transmitting the formatted transmission signal to the network server, wherein the network server receives the formatted transmission signal for performing on-demand service of analysis of the formatted transmission signal, and a generation of at least one report based on the analysis of the formatted transmission signal related to the one or more operating conditions of the at least one equipment;

wherein the at least one report is generated by combining classified sensor data with a predictive model to estimate predictive model metrics related to the at least one equipment, the predictive model metrics comprising at least one of: a failure risk, a cost of preventive maintenance, or a cost impact of an equipment failure;

wherein the network server, with a web server, provides at least one recommendation for maintenance intervention of the at least one equipment based on the analysis of the formatted transmission signal.

12. The method of claim 11, wherein the network server is a cloud-based server.

13. The method of claim 11, wherein the sensor data signal is transmitted to the network device using 6LoWPAN as a wireless network protocol and the network device transforms the collected sensor data into one of an IPv4 or IPv6 formatted transmission signal.

14. The method of claim 11, wherein at least one sensor is one of a plurality of sensors forming a sensor network, and wherein the sensor network is configured to pre-process the sensor data forward to a gateway which forwards the sensor data to the network server which identifies a defective operating condition.

15. The method of claim 14, wherein one or more sensors of the sensor network is configured to pre-process the sensor data received from one or more sensors of the other sensors of the sensor network.

16. The method of claim 14, wherein the plurality of sensors are battery powered and further comprising determining a battery status of each sensor of the plurality of sensors wherein sensors having a relatively higher battery charge pre-process the pre-processing load sent from sensors having a relatively lower battery charge.

17. A method, comprising:

receiving a formatted transmission signal over a network, the formatted transmission signal being transmitted from a network device and having been generated by the network device after having transformed a formatted sensor data signal into the formatted transmission signal dependent on collected sensor data, the sensor data having been collected from the formatted sensor data signal received by the network device from a network node related to at least one selected sensor, the network node comprising:

a sensor network interface;

a maintenance server configured to manage a health status of the at least one equipment;

a production server comprising a production schedule of the at least one equipment, the production server configured to balance the load of the at least one equipment based on the health status of the at least one equipment; and a data monitoring system configured to manage a power consumption profile of the at least one equipment, and to detect the sensor data via the sensor network interface, the formatted sensor data signal having been generated after execution of application code of the network node wherein the selected at least one sensor is installed using a non-invasive method for detecting one or more operating conditions of at least one equipment, the sensor data including one or more operating conditions of the at least one equipment, wherein the at least one sensor is selected from a database dependent on indications of one or more user restrictions comprising: at least a type of the at least one sensor, a cost of the at least one sensor, and sampling frequency of the at least one sensor;

performing on-demand service of analysis of the formatted transmission signal, and a generation of at least one report based on the analysis of the formatted transmission signal related to the one or more operating conditions of the at least one equipment;

wherein the at least one report is generated by combining classified sensor data with a predictive model to estimate predictive model metrics related to the at least one equipment, the predictive model metrics comprising at least one of: a failure risk, a cost of preventive maintenance, or a cost impact of an equipment failure;

providing at least one recommendation, with a web server, for maintenance intervention of the at least one equipment based on the analysis of the formatted transmission signal.

18. The method of claim 17, wherein the receiving and performing is done using a cloud-based server.

19. The method of claim 17, wherein the sensor data signal is transmitted to the network device using 6LoWPAN as a wireless network protocol and the network device transforms the collected sensor data into one of an IPv4 or IPv6 formatted transmission signal.

20. The method of claim 17, wherein at least one sensor is one of a plurality of sensors forming a sensor network, and wherein the sensor network is configured to pre-process the sensor data forward to a gateway which forwards the sensor data to the Network Server which identifies a defective operating condition.

21. The method of claim 20, wherein one or more sensors of the sensor network is configured to pre-process the sensor data received from one or more sensors of the other sensors of the sensor network.

22. The method of claim 20, wherein the plurality of sensors are battery powered, and further comprising determining a battery status of each sensor of the plurality of sensors, wherein sensors having a relatively higher battery charge pre-process the pre-processing load sent from sensors having a relatively lower battery charge.

23. The method of claim 17, wherein the sensor data is transmitted to the network device via a publish-subscribe based messaging protocol.

24. The method of claim 1, wherein:

the production server is configured to balance the load of the at least one equipment based on the health status of the at least one equipment; and the network server is configured to access the production schedule of the production server, to provide at least one suggestion of a maintenance schedule for the at least one user equipment, and to auto execute a load balance of the at least one equipment.

* * * * *